United States Patent [19]

Takeuchi et al.

[11] 4,213,288

[45] Jul. 22, 1980

[54] POWER TRANSMISSION DEVICE FOR A POWER-OPERATED LAWN MOWER

[75] Inventors: Masayuki Takeuchi; Kenji Nakamura, both of Asaka; Masahiro Handa, Wako, all of Japan

[73] Assignee: Honda Giken Kogyo Kabushiki Kaisha, Tokyo, Japan

[21] Appl. No.: 910,526

[22] Filed: May 30, 1978

[30] Foreign Application Priority Data

Jun. 2, 1977 [JP] Japan .................. 52/5270757[U]

[51] Int. Cl.² ............................................ A01D 69/08
[52] U.S. Cl. ...................................... 56/11.6; 192/11
[58] Field of Search .................. 192/11; 56/11.3, 11.6

[56] References Cited

U.S. PATENT DOCUMENTS

| | | | |
|---|---|---|---|
| 3,367,459 | 2/1968 | Rubin | 56/11.6 |
| 3,543,892 | 12/1970 | De Baillie | 56/11.6 |
| 4,058,957 | 11/1977 | Roseberry | 56/11.3 |
| 4,117,651 | 10/1978 | Martin | 56/11.3 |

*Primary Examiner*—Francis K. Zugel
*Attorney, Agent, or Firm*—Polster, Polster and Lucchesi

[57] ABSTRACT

A power transmission device for a power-operated lawn mower of a type, in which a driving pulley and a driven pulley are respectively fitted fixedly and rotatably on a power output shaft of a prime mover such as an internal combustion engine, an electric motor, and so forth, another driven pulley is rotatably fitted on a separate shaft disposed in parallel with the output shaft, a cutting blade is fastened to the first-mentioned driven pulley rotatably fitted on the output shaft as an integral part thereof, a first drive belt is loosely extended between the driving pulley and the second-mentioned driven pulley, a second drive belt is tightly extended between the first and second-mentioned driven pulleys, a tension pulley is further provided on a swingable supporting arm to impart tension to the loosely extended belt when the cutting blade is to be rotated for lawn mowing, and a brake applying implement is provided on one part of the swingable supporting arm to apply frictional braking force to the second-mentioned driven pulley when the cutting blade is to be stopped. The tension-imparting and brake-applying operations to the loosely extended drive belt and the second driven pulley, respectively, are effected by an operator through gripping and releasing of a control lever provided at a position of a handle connected to the swingable supporting arm by a cord or wire.

1 Claim, 6 Drawing Figures

POWER TRANSMISSION DEVICE FOR A POWER-OPERATED LAWN MOWER

BACKGROUND OF THE INVENTION

This invention relates to a lawn mower, and, more particularly, it is concerned with a power-operated lawn mower of a type, in which the cutting blade thereof is driven by an internal combustion engine, and electric motor, or like other prime movers.

In this type of lawn mower, most of injuries caused to an operator during its use is due to the rotating cutting blades. As the safety measures against such possible danger, there has been proposed a construction such that a switching device is provided at a position of a handle grip for the lawn mower, the switch being closed when the handle is gripped by the operator, whereby the prime mover continues its operation as long as the handle is gripped, and it stops its operation when the operator leaves his hands off the handle grip.

In the above-described safety device, however, when the operator requires to leave his hands off the handle grip very frequently, there would arise inconveniences such that, in the case of the internal combustion engine being used with the lawn mowing machine, the engine should be re-started at every time, and, moreover, the engine starting device should be so constructed that the starting operation may be done at the position of the handle grip, hence the construction of the starting device for the engine becomes complicated. On the other hand, in the case of the electric motor being used with the lawn mower, such frequent motion (rotation) and stoppage of the electric motor unavoidably impairs durability of the electric motor.

SUMMARY OF THE INVENTION

In view of the above-described various disadvantages inherent in the known types of lawn mowing machine, it is an object of the present invention to provide a power transmission device for such lawn mowing device, which is simple in construction and which is capable of instantaneously stopping the blade operation as soon as the operator removes his hands from the handle grip, while the prime mover still continues its rotation.

According to the present invention, generally speaking, there is provided a power transmission device for a power-operated lawn mower which comprises in combination a prime mover, an output shaft, through which driving force of the prime mover is transmitted, a driving pulley fixedly provided on the output shaft, a first driven pulley rotatably fitted on the output shaft, a cutting blade integrally fastened to the first driven pulley, a second driven pulley separately provided from the driving pulley and the first driven pulley on a supporting shaft disposed in parallel with the output shaft in a freely rotatable manner, a first drive belt loosely extended between the driving pulley and the second driven pulley, a second drive belt tightly extended between the first driven pulley and the second driven pulley, an oscillatable arm pivotally fixed at one end thereof on a shaft and constantly biassed toward the second driven pulley by a spring, a tension-imparting pulley supported at the other end of the oscillatable arm to impart tension to the loosely extended first drive belt at the time of driving the cutting blade, brake applying implement provided on one part of the oscillatable supporting arm to apply braking force to the second driven pulley simultaneously with loosening of the first drive belt when the oscillatable supporting arm is biassed toward the second driven pulley by the spring force, control of the oscillatable supporting arm being effected by a control lever provided on a handle of the lawn mower to be operated by an operator through a cord or wire connecting the lever and the supporting arm.

There have thus been outlined rather broadly the more important features of the present invention in order that the detailed description thereof that follows may be best understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based, may readily be utilized as a basis for the designing of other structures for carrying out the several purposes of the invention. It is important therefore that the claims be regarded as including such equivalent constructions to an extent that they do not depart from the spirit and scope of the invention.

BRIEF DESCRIPTION OF THE ACCOMPANYING DRAWING

Specific embodiment of the present invention has been chosen for the purpose of illustration and description, and is shown in the accompanying drawing, forming a part of the specification, in which.

DETAILED DESCRIPTION OF PREFERRED EMBODIMENT

Figure 1:
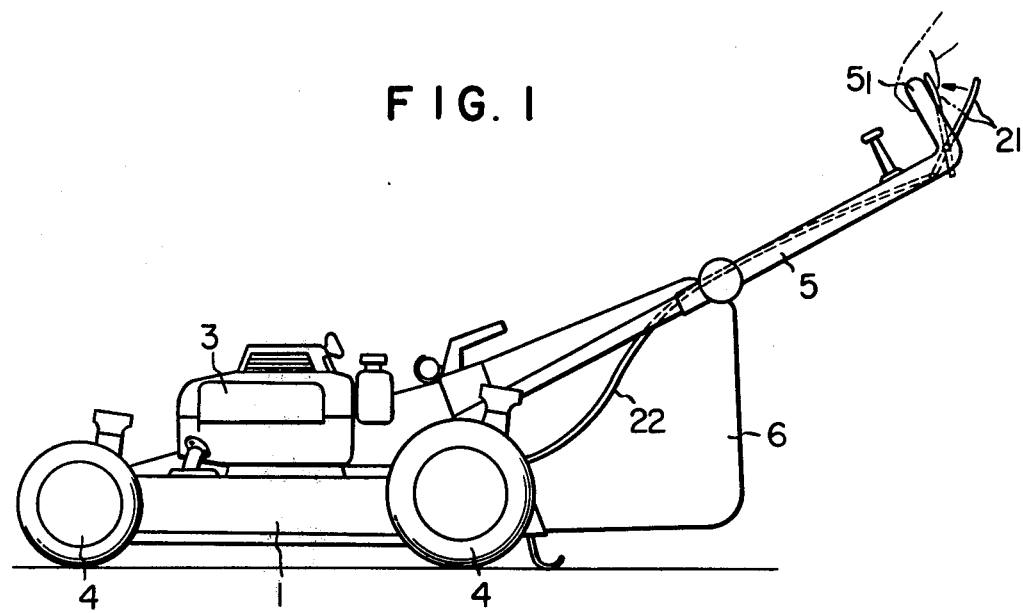
FIG. 1 is a schematic side elevational view of a power-operated lawn mower provided with the power transmission device according to the present invention.

Referring now to FIGS. 1 to 6 of the accompanying drawing, a rotary type power-operated lawn mower, in which the power-transmission device according to the present invention is incorporated, generally comprises a pot-shaped main body casing of the lawn mower 1, a rotational blade 2 housed in the main body casing 1, a prime mover 3 disposed on the top surface of the main body casing 1, wheels 4, on which the entire machine is held and made movable in all directions, a handle 5 to steer the lawn mower, and on which a control device for starting and stopping the cutting blade is provided, a grass collecting bag 6, in which grass cut by the rotary blade is collected, a power output shaft 7 of the prime mover projected downwardly toward the center lower surface of the main body casing 1 of the machine, a driving pulley 8 fixedly provided on the output shaft 7, a driven pulley 9 also provided on the output shaft in a freely rotatable manner through a bearing 10, the cutting blade 2 being fastened to the bottom surface of this rotatable pulley 9 as an integral part thereof, a supporting shaft 11 arranged in parallel with the output shaft 7, either on the fixed position or in a position-adjustable manner, another driven pulley 12 having a large width rotatably fitted on the supporting shaft 11 through a bearing 13, a drive belt 14 loosely extended between the driving pulley 8 and the driven pulley 12, and another drive belt 15 tightly extended between the driven pulleys 9 and 12.

In addition to the above, there is further provided a tension pulley 16 to impart a tension to the drive belt 14 loosely extended between the driving pulley 8 and the driven pulley 12. The pulley 16 is held on one end of a swingable supporting arm 17. The swingable supporting arm 17 for the pulley 16 is so disposed that, when the belt-slipping type clutch (or a tension clutch) is disengaged, it may come near to the driven pulley 12 by force of a return spring 18. A frictional braking member 19 is fixedly provided on one part of the supporting arm 17 to control rotation of the pulley 12. The return spring 18 for the supporting arm 17 consists of a coil spring which is provided around a swinging shaft 20. A clutch lever 21 is provided in the vicinity of a gripping section $5_1$ of the handle 5, and is connected to the tension pulley supporting arm 17 by way of a wire or cord 22.

The opeations of the rotary type lawn mower of the above-described construction will now be explained hereinbelow.

Figure 2:
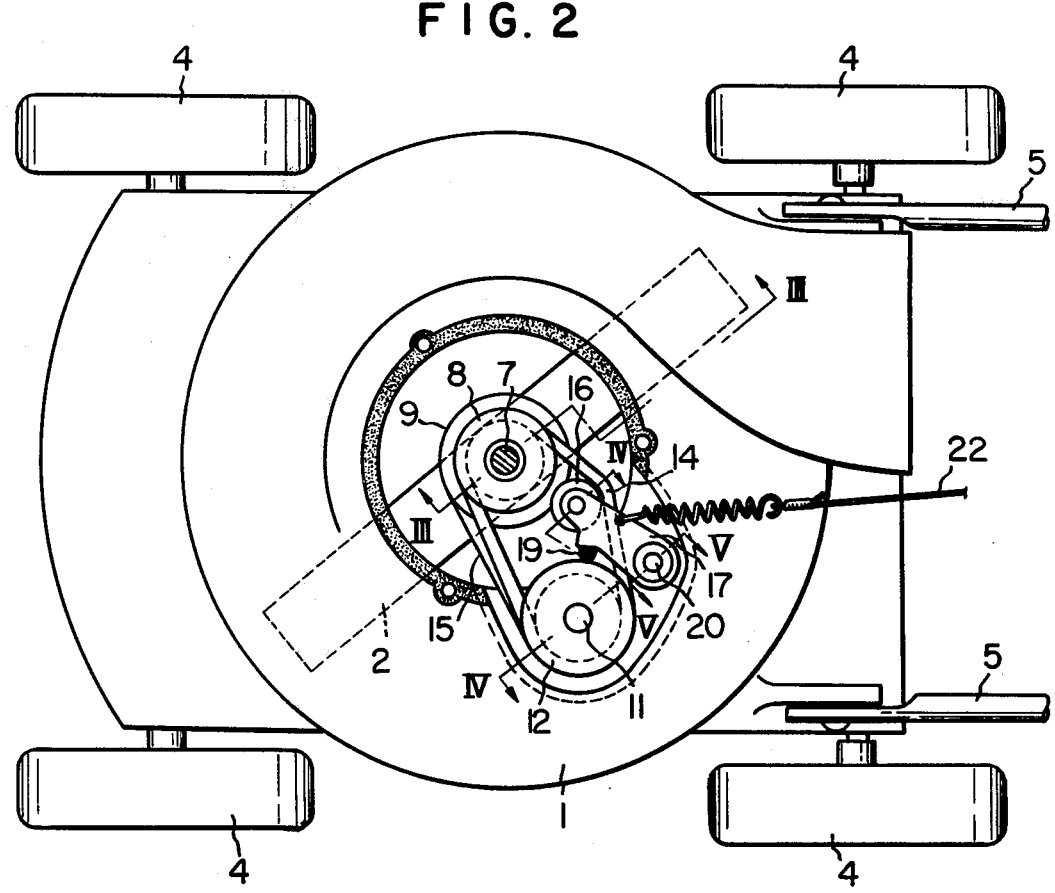
FIG. 2 is a plan view of the power transmission device, in which a belt-slipping type clutch (or, a tension clutch) is in an engaged state.
Figure 3:
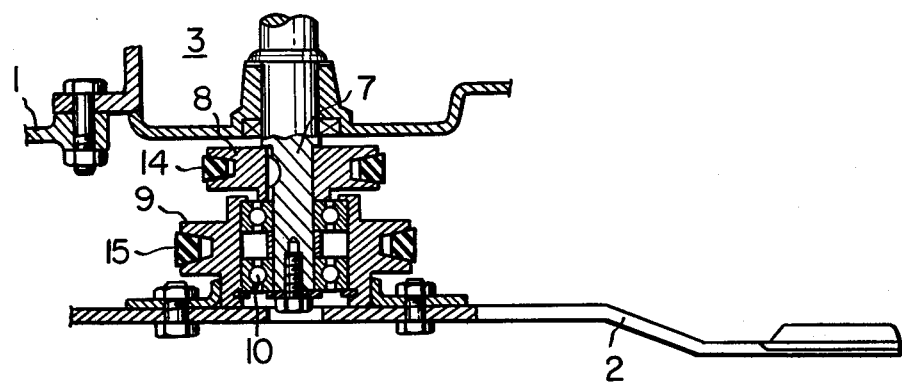
FIG. 3 is a longitudinal cross-sectional view of a part of the power transmission device according to the present invention taken along the line III—III in FIG. 2.

When the prime mover 3 such as an internal combustion engine, an electric motor, and so on is started, and the clutch control lever 21 is gripped together with the handle 5 as indicated by chain lines in FIG. 1, the tension pulley supporting arm 17 oscillates rightward through the wire or cord 22 against force of the return spring 18 as shown in FIG. 2, whereupon the frictional braking member 19 moves away from the driven pulley 12, and the tension imparting pulley 16 becomes engaged with the drive belt 14 to give sufficient tension thereto. As the result of this, rotation of the prime mover 3 is transmitted to the cutting blade 2 through the drive belts 14 and 15.

Figure 4:
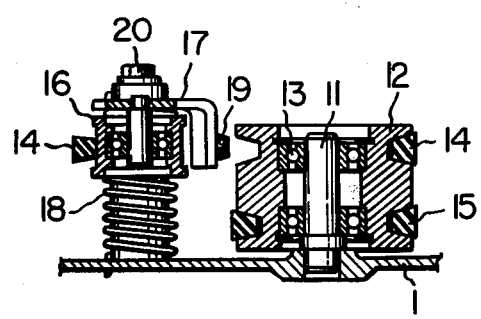
FIG. 4 is also a longitudinal cross-sectional view of a part of the power transmission device according to the present invention taken along the line IV—IV in FIG. 2.
Figure 5:
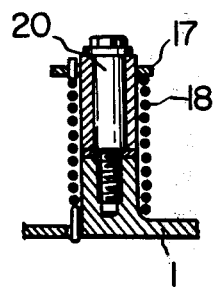
FIG. 5 is further a longitudinal cross-sectional view of a part of the device according to the present invention taken along the line V—V in FIG. 2.
Figure 6:
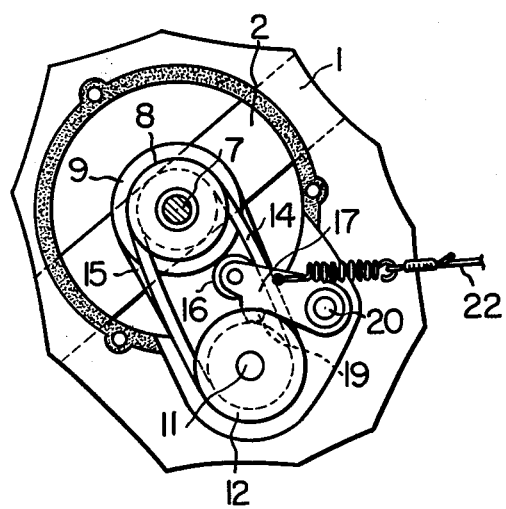
FIG. 6 is a plan view of the power-transmission device, in which the clutch is in a disengaged state.

When an operator leaves his hands off the handle 5, the supporting arm 17 for the tension pulley 16 oscillates leftward as shown in FIG. 4 by the action of the return spring 18, whereby the drive belt 14 is loosened to interrupt transmission of the power from the prime mover, whereby the frictional braking member 19 is pressed against the driven pulley 12 by the leftward oscillation of the supporting arm 17 to stop rotation of the cutting blade 2.

While the frictional braking member 19 may be caused to act on the driven pulley 12, to which the rotational cutting blade 2 is integrally fastened, the braking action is more effective in the power transmission device of a type as in the above-described embodiment, in which the driven pulley 12 is provided, to cause it to act thereon, because of its small rotational inertia. Moreover, in the foregoing explanations, the rotary type lawn mower has been exemplified as a preferred embodiment. It should however be understood that the invention can equally be applied to a reel type lawn mower.

Since the power transmission device according to the present invention is constructed as mentioned above, there takes place no rotation of the rotational cutting blade 2 unless the handle 5 is gripped, even when the prime mover 3 is started. When the operator removes his hands from the handle 5 during the lawn cutting operation, the driving force to the rotational blade 2 is interrupted owing to the afore-described action of the tension-imparting pulley supporting arm 17, and, at the same time, the braking force is applied to the driven pulley 12 (or 9 at the side of the rotational blade 2). As the result, the cutting blade instantaneously stops its rotation hence no injury is caused to the operator, even when he happens to touch the blade 2. During this stoppage of the rotational blade 2, since the prime mover 3 is still continuing its rotation, there is no necessity for re-starting the prime mover at every time the blade is stopped, hence the lawn mower can be operated very easily and smoothly without any interruption caused to the prime mover.

In addition, since the power transmission device according to the present invention has adopted the belt-slipping type clutch (or a tension clutch), the number of revolution of the cutting blade can be arbitrarily set with respect to the number of revolution of the prime mover by selecting the diameter of the pulley. Furthermore, when the power output shaft 7 of the prime mover and the shaft of the rotational cutting blade 2 are disposed coaxially through the driven pulley 12, the machine as a whole can be reduced its size in spite of its being driven by the belt. While the present invention has been explained in detail in the foregoing with reference to a preferred embodiment thereof, it should be understood that the invention is not limited to this specific embodiment, and that any changes and modifications may be made thereto within the spirit and scope of the invention as set forth in the appended claims.

What is claimed is:

1. In a power transmission device for a power-operated lawn mower having a steering handle, a main body housing, a prime mover, an output shaft extending from said prime mover to transmit driving force thereof, a driving pulley, a driven pulley, a cutting blade, a drive belt, oscillatable control arm means, a tension-imparting pulley supported at one end of the control arm means to impart tension to said drive belt at the time of driving said cutting blade, and brake applying means, the improvement which comprises: said driving pulley and a first driven pulley being concentrically fitted on said output shaft, the former being rigidly mounted thereon and the latter being fitted thereon in a freely rotatable manner; the cutting blade being fastened to said first driven pulley; a second driven pulley separately provided from said driving pulley and said first driven pulley on a separate supporting shaft disposed in parallel with said output shaft in a freely rotatable manner; a first drive belt loosely extended between said driving pulley and said second driven pulley; a second drive belt tightly extended between said first driven pulley and said second driven pulley; and said brake applying means provided on one part of said oscillatable arm means to apply braking force to said second driven pulley simultaneously with loosening of said first drive belt when said oscillatable arm means is biased toward said second driven pulley by spring force, control of said oscillatable arm means being effected by a control lever provided on said steering handle of said lawn mower to be operated by an operator through flexible means connecting said lever and said oscillatable arm means.

* * * * *